US008566589B1

(12) United States Patent
Satish

(10) Patent No.: US 8,566,589 B1
(45) Date of Patent: Oct. 22, 2013

(54) METHOD AND APPARATUS FOR IDENTIFYING A WEB SERVER

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 924 days.

(21) Appl. No.: 11/862,859

(22) Filed: Sep. 27, 2007

(51) Int. Cl.
  *H04L 29/06* (2006.01)
(52) U.S. Cl.
  USPC ......................................................... 713/168
(58) Field of Classification Search
  USPC ............ 713/168, 175, 176, 187, 188; 726/12, 726/13, 22
  See application file for complete search history.

(56) References Cited

U.S. PATENT DOCUMENTS

| | | | |
|---|---|---|---|
| 6,496,824 B1 * | 12/2002 | Wilf ............................. | 707/688 |
| 7,237,264 B1 * | 6/2007 | Graham et al. ................ | 726/23 |
| 7,519,954 B1 * | 4/2009 | Beddoe et al. ................ | 717/124 |
| 7,680,929 B1 * | 3/2010 | Lyon ............................. | 709/224 |
| 2003/0200304 A1 * | 10/2003 | Thorpe et al. ................. | 709/224 |
| 2004/0003248 A1 * | 1/2004 | Arkhipov ....................... | 713/170 |
| 2004/0123157 A1 * | 6/2004 | Alagna et al. ................. | 713/201 |
| 2006/0041754 A1 * | 2/2006 | Hind et al. .................... | 713/176 |
| 2006/0069697 A1 * | 3/2006 | Shraim et al. ................ | 707/102 |
| 2007/0025265 A1 * | 2/2007 | Porras et al. .................. | 370/252 |
| 2007/0078983 A1 * | 4/2007 | Modrall ........................ | 709/226 |
| 2007/0083670 A1 * | 4/2007 | Kelley et al. ................. | 709/245 |
| 2008/0244744 A1 * | 10/2008 | Thomas et al. ............... | 726/23 |
| 2008/0289047 A1 * | 11/2008 | Benea et al. .................. | 726/27 |
| 2010/0125663 A1 * | 5/2010 | Donovan et al. ............. | 709/224 |

FOREIGN PATENT DOCUMENTS

WO    WO 2007137353 A1 * 12/2007

OTHER PUBLICATIONS

Gajek et al., Towards multicolored computing—compartmented security to prevent phishing attacks. 2006. In Workshop on Information and System Security (WISSEC'06).*
Templeton et al., "Detecting spoofed packets," DARPA Information Survivability Conference and Exposition, 2003. Proceedings, vol. 1, no., pp. 164-175 vol. 1, Apr. 22-24, 2003.*
Shah, "An Introduction to HTTP Fingerprinting", Nov. 30, 2003, Net-Square Solutions.*
Lee, Dustin William, "HMAP: A Technique and Tool for Remote Identification of HTTP Servers," Thesis submitted for the degree of Master of Science in Computer Science in the Office of Graduate Studies of the University of California Davis, 2001.

* cited by examiner

*Primary Examiner* — Eleni Shiferaw
*Assistant Examiner* — Hilary Branske
(74) *Attorney, Agent, or Firm* — Wilmer Cutler Pickering Hale and Dorr LLP

(57) ABSTRACT

Method and apparatus for identifying a web server is described. In some examples, an initial request by a client to an intended web server is identified. A fingerprint for the intended web server is determined responsive to the initial request. A subsequent request by the client to the intended web server is detected. A response to the subsequent request is received from a responding web server. Verification of the responding web server as the intended web server is performed using the fingerprint.

16 Claims, 6 Drawing Sheets

METHOD AND APPARATUS FOR IDENTIFYING A WEB SERVER

BACKGROUND OF THE INVENTION

1. Field of the Invention

The present invention relates generally to client-web server transactions More particularly, the present invention relates to a method and apparatus for identifying a web server.

2. Description of the Related Art

The Internet and the World Wide Web ("web") have become commonplace, providing millions of web sites. Many of these web sites employ hypertext transfer protocol (HTTP) as the primary protocol for the exchange of information between server and host, while other web sites employ a secure version of HTTP known as HTTPS. With HTTP, there is no reliable mechanism of distinguishing a legitimate web site from an illegitimate web site masquerading as the legitimate web site. Notably, the proliferation of the Internet and the web has spawned various mechanisms for fraudulently obtaining information from end users, such as phishing, pharming, domain name system (DNS) pinning, cache poisoning, and the like. Phishing is a mechanism whereby "phishers" attempt to fraudulently acquire sensitive information from end users by masquerading as a trustworthy entity in an electronic communication (e.g., an e-mail). Pharming is a mechanism that attempts to redirect traffic from a legitimate web site to another illegitimate or bogus web site. DNS pinning and cache poisoning involve attempts to exploit the DNS process to redirect traffic from legitimate web sites to illegitimate web sites.

Recently, phishing, pharming, and DNS related attacks have dramatically risen and have negatively impacted the confidence of end users. Such attacks have resulted in billions of dollars of loss to enterprises. Accordingly, many technologies have been developed to combat such fraudulent mechanisms. Such technologies include a combination of client side heuristics and whitelist/blacklist techniques to detect phishing, pharming, DNS attacks, and the like. Whitelist/blacklist techniques, however, require constant maintenance on the backend and continuous updates to the clients to maintain performance. It has become imperative to offer better security when interacting with web sites using non-secure means, such as HTTP. Accordingly, there exists a need in the art for an improved method and apparatus for identifying a web server as a legitimate web server.

SUMMARY OF THE INVENTION

Method and apparatus for identifying a web server is described. In some embodiments, an initial request by a client to an intended web server is identified. A fingerprint for the intended web server is determined responsive to the initial request. A subsequent request by the client to the intended web server is detected. A response to the subsequent request is received from a responding web server. Identification of the responding web server as the intended web server is performed using the fingerprint.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
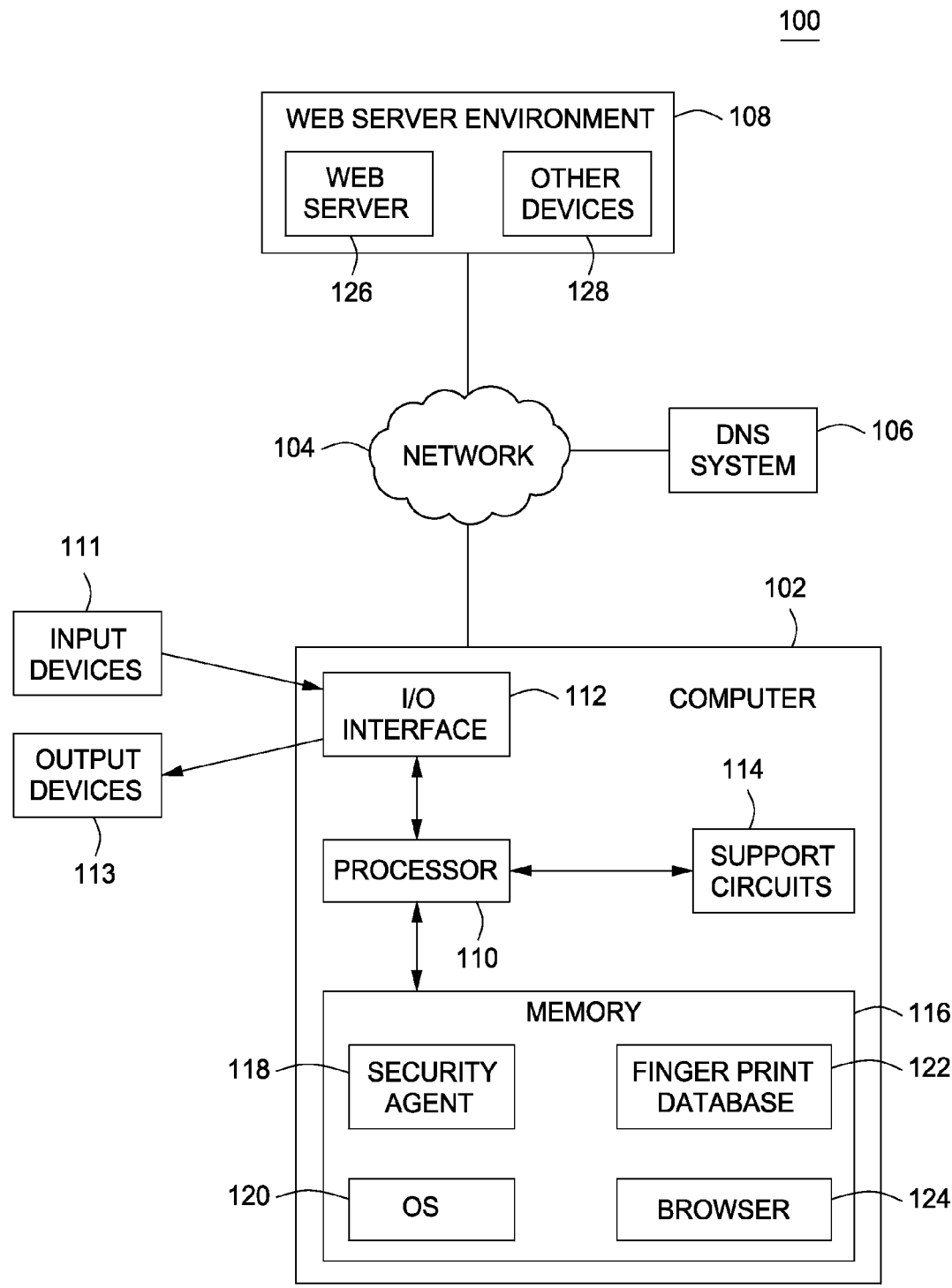
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The system 100 includes a computer 102, a network 104, a domain name system (DNS) 106, and a web server environment 108. The network 104 comprises a communication system that connects computer systems by wire, cable, fiber optic, and/or wireless links facilitated by various types of well-known network elements, such as hubs, switches, routers, and the like. In particular, the network 104 connects the computer 102, the DNS 106, and the web server environment 108. The network 104 may employ various well-known protocols to communicate information. For example, the network 102 may be part of the Internet and thus employ internet protocol (IP), transmission control protocol (TCP), and the like for the transmission of packets.

The web server environment 108 may include one or more servers, appliances, and/or devices configured to communicate world wide web (WWW) content with hosts connected to the network 104. The WWW content may be transferred over the network 104 using hypertext transfer protocol (HTTP). An exemplary version of HTTP commonly used is HTTP/1.1 as described in request for comments (RFC) 2616. Other versions of HTTP may be employed and aspects of the invention described herein are not limited to use with any one version of HTTP. WWW content transferred using HTTP may include text data, such as hypertext markup language (HTML) pages, as well as binary data, such as images (e.g., JPEGs, GIFs, etc.). The web server environment 108 may include a web server 126 configured to accept HTTP requests from hosts on the network and provide HTTP responses along with WWW content. The web server environment 108 may include other devices 128 that cooperate with the web server 126, such as load balancers, firewalls, and like type devices known in the art.

The DNS 106 is configured to translate hostnames (e.g., www.symantec.com) into IP addresses, such as 192.168.1.1. The process of obtaining an IP address corresponding to a hostname is referred to as a DNS resolution process. The DNS 106 is also configured to translate IP address into hostnames. The process of obtaining a hostname corresponding to an IP address is referred to as reverse DNS lookup or a reverse DNS resolution process. DNS and reverse DNS are well known in the art.

The computer 102 illustratively includes a processor 110, a memory 116, various support circuits 114, an I/O interface 112. The processor 110 may include one or more microprocessors known in the art. The support circuits 114 for the processor 110 include conventional cache, power supplies, clock circuits, data registers, I/O interfaces, and the like. The I/O interface 112 may be directly coupled to the memory 116 or coupled through the processor 110. The I/O interface 112 may also be configured for communication with input devices 111 and/or output devices 113, such as, network devices, various storage devices, mouse, keyboard, display, and the like. The I/O interface 112 is also coupled to the network 104.

In some embodiments, the memory 116 stores processor-executable instructions and/or data that may be executed by and/or used by the processor 110. These processor-executable instructions may comprise hardware, firmware, software, and the like, or some combination thereof. Modules having processor-executable instructions that are stored in the memory 116 may include a security agent 118, a browser 124, and an operating system (OS) 120. Data stored in the memory 116 may include a fingerprint database 122. The operating system 120 may include, OS/2, JAVA VIRTUAL MACHINE, LINUX, SOLARIS, UNIX, HPUX, AIX, WINDOWS, WINDOWS95, WINDOWS98, WINDOWS NT, AND WINDOWS2000, WINDOWSME, WINDOWSXP, WINDOWS SERVER, among other known platforms. The memory 116 may include one or more of the following random access memory, read only memory, magneto-resistive read/write memory, optical read/write memory, cache memory, magnetic read/write memory, and the like, as well as signal-bearing media as described below. In other embodiments, all or a portion of each of the security agent 118, the browser 124, the operating system 120, and the fingerprint database 122 may be implemented in hardware, software, or a combination of hardware and software, including implementations using programmable logic devices (PLDs), application specific integrated circuits (ASICs), and the like. Thus, the term "module" as used herein encompasses software implementations, hardware implementations, or a combination of software and hardware implementations.

The browser 124 in combination with the operating system 120 communicates with web servers on the network 104, such as the web server 126 in the web server environment 108. The browser 124 exchanges information with the web server 126 using HTTP. Although aspects of the invention are discussed with respect to HTTP, those skilled in the art will appreciate that the invention may be used with other (potentially later developed) protocols similar to HTTP. As is known in the art, HTTP is a request/response protocol between a client (e.g., the browser 124) and a server (e.g., the web server 126). The browser 124 makes HTTP requests. The web server 126 provides HTTP responses along with WWW content. An HTTP request identifies WWW content to be accessed using uniform resource identifiers (URIs), or more specifically, uniform resource locators (URLs). A URI or URL typically includes a hostname and a resource on the named host to be accessed (e.g., a particular HTML file). The browser 124 interacts with a DNS (e.g., the DNS 106) to translate a hostname in a URI/URL to an IP address.

In particular, an HTTP request includes a request line, headers, and an optional message body. The request line indicates a request method to be performed, such as the GET method for retrieve a resource indicated in the URI/URL. The headers may include information about the client software (e.g., browser 124) making the request, including its preferences regarding the HTTP response. The message body is typically only present if the request line includes a special method known as the POST method, which submits data to be processed to the identified resource.

An HTTP response includes a response line, headers, and a body. The response line indicates a response code, which is a numeric value that describes the success or failure with respect to the handling of the HTTP request. The response line may also include a response message, which is a human readable description of the response code. The headers may include information about the server software (e.g., the web server software in the web server 126). The body may include a requested resource, such as HTML data.

The security agent 118 may comprise a stand alone module or be an extension to the browser 124 and/or operating system 120. The security agent 118 monitors domain name resolutions and HTTP traffic between IP addresses. As the user interacts with different web sites, the security agent 118 determines fingerprints of the corresponding web servers. The security agent 118 may fingerprint a web server by constructing specific requests to elicit specific responses that carry enough information to uniquely identify the web server. Fingerprints for various web servers may be stored in the fingerprint database 122. As the user returns to a web site, the security agent 118 verifies that a fingerprint of a responding web server matches the fingerprint in the fingerprint database 122 for the expected web server for the web site.

Figure 2:
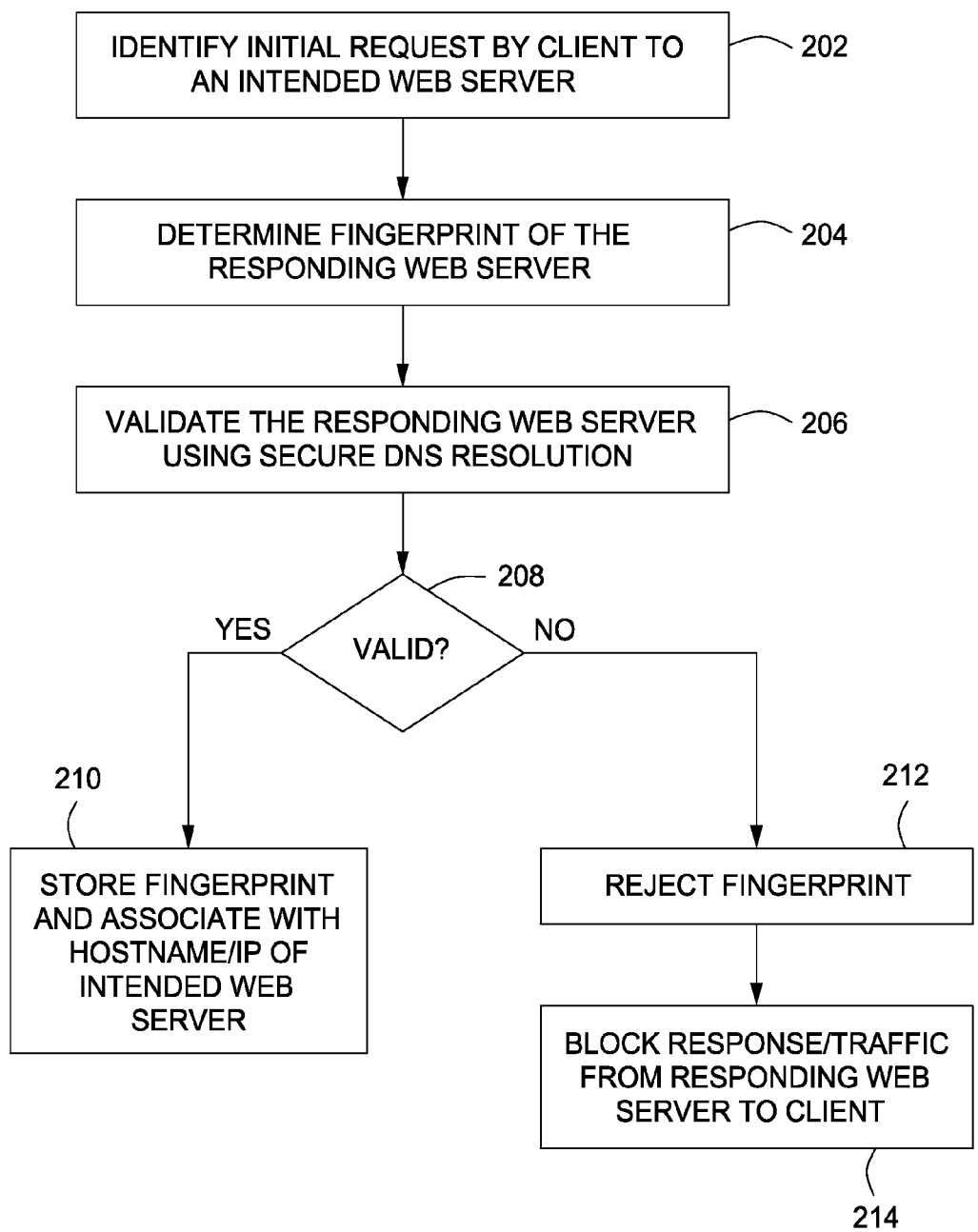
FIG. 2 is a flow diagram depicting an exemplary embodiment of a method for initially identifying a web server in accordance with one or more aspects of the invention.

FIG. 2 is a flow diagram depicting an exemplary embodiment of a method 200 for initially identifying a web server in accordance with one or more aspects of the invention. The method 200 may be performed by the security agent 118. The method 200 may be understood with reference to FIG. 1, where the web server being identified is the web server 126. The method 200 begins at step 202, where the security agent 118 identifies an initial request by the browser 124 to an intended web server. In the present example, the intended web server is the web server 126. The browser 124 is the client providing the request. An initial request indicates that the browser 124 is accessing a web site provided by the intended web server for the first time. The initial request may be an HTTP request, as described above. The identity of the intended web server may be characterized by the IP address, hostname, or both IP address and hostname thereof.

At step 204, the security agent 118 determines a fingerprint for the responding web server. As used herein, a responding web server is a web server responding to a request by a client (also referred to as a responding source). In the present case, the responding web server is the web server that provides the response to the initial request. In absence of a phishing, pharming, DNS, or like type attack, the responding web server is the intended web server, i.e., the web server 126. The fingerprint comprises data that can be used to identify the responding web server with a particular degree of confidence, depending on the web server characteristics used to create the fingerprint.

Figure 3:
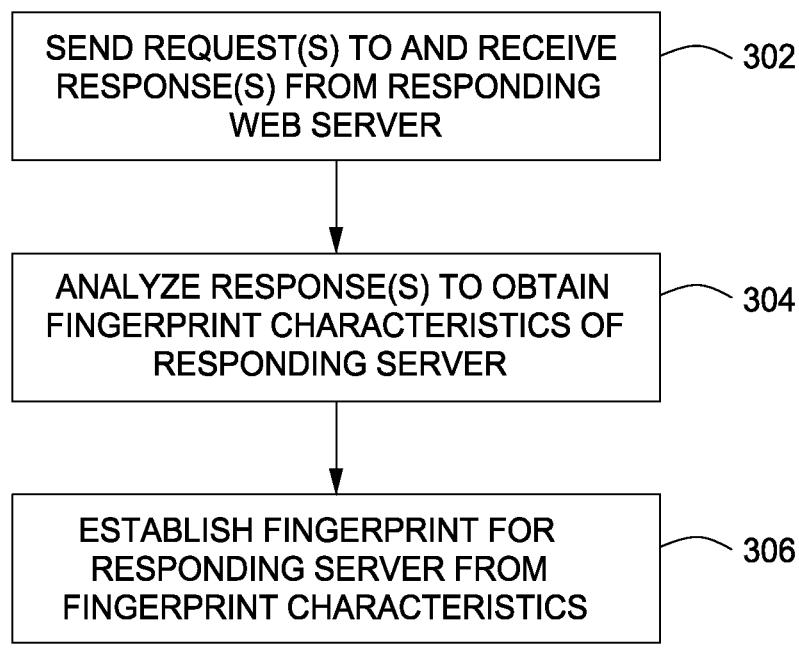
FIG. 3 is a flow diagram depicting an exemplary embodiment of a method for fingerprinting a web server in accordance with one or more aspects of the invention.

FIG. 3 is a flow diagram depicting an exemplary embodiment of a method 300 for fingerprinting a web server in accordance with one or more aspects of the invention. The method 300 may be performed by the security agent 118 and may be performed during step 204 of the method 200. The method 300 may be understood with reference to FIG. 2, where the server being fingerprinted is the responding web server. The method 300 begins at step 302, where the security agent 118 sends at least one request to the responding web server and receives at least one response from the responding web server. The request(s) may be HTTP request(s) and the response(s) may be HTTP response(s). The request(s) may be specifically designed to elicit particular response(s) from the responding web server. In particular, each web server may exhibit particular characteristics that enable identification of the responding web server ("fingerprint characteristics"). The security agent 118 forms the response(s) so as to provoke responses from the responding web server exemplifying these fingerprint characteristics. Exemplary fingerprint characteristics may be: (1) lexical, such as the specific words, phrases, and punctuation that the web server uses in its responses; (2) syntactic, such as the ordering and context of words, phrases, headers, and other elements that the web server uses in its responses; and/or (3) semantic, such as specific interpretations by the web server of particular requests among a universe of possible interpretations.

By way of example, consider an HTTP response describing the success or failure of request satisfaction. Such an HTTP response includes a numeric value and some human readable text describing the success or failure. For example, for an HTTP error code 404, if the responding web server is running first web server software, the responding web server may report "Not Found" in the response. If the responding web server is running second web server software different that the first, the responding web server may report "Object Not Found" in the response. Thus, the security agent 118 can construct a request for an object that will not be found on the responding web server and analyze the response. The particular text used to indicate the HTTP 404 error is a fingerprint characteristic of the responding web server. Those skilled in the art will appreciate that there are a myriad of possible fingerprint characteristics of web servers and will understand how to construct requests to obtain such fingerprint characteristics.

Returning to FIG. 3, at step 304, the security agent 118 analyzes the response(s) to obtain fingerprint characteristics of the responding web server. At step 306, a fingerprint for the responding web server is established from the fingerprint characteristics.

Returning to FIG. 2, at step 206, the security agent 118 may validate the responding server using secure DNS resolution. For example, the security agent 118 may perform a reverse DNS lookup using the IP address of the packets carrying web server responses to obtain a hostname. If the hostname matches that in the initial request, then the responding server is deemed valid. Otherwise, the responding server is deemed invalid. Those skilled in the art will appreciate that other mechanisms of secure DNS resolution may be employed to verify that the web server responding to the initial request is indeed the desired web server.

At step 208, a determination is made whether responding server is valid. If so, the method 200 proceeds to step 210, where the fingerprint may be stored for later access. For example, the fingerprint may be stored as an entry in the fingerprint database 122. In some embodiments, the storage of the fingerprint may be secured using any known cryptographic technique. Otherwise, the method 200 proceeds to step 212, where the fingerprint is rejected. At step 214, responses and traffic from the responding server is blocked from the browser 124.

Figure 4:
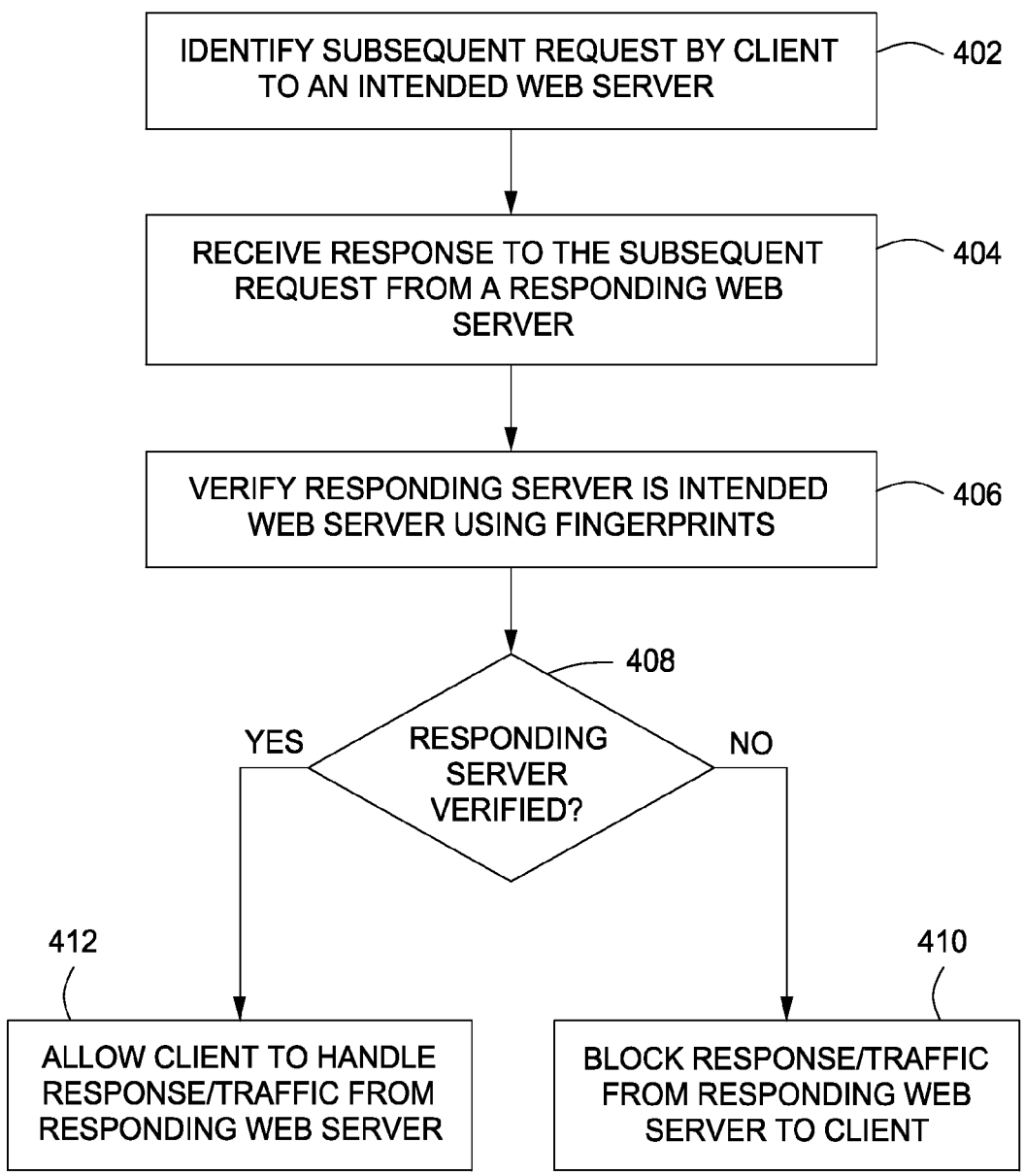
FIG. 4 is a flow diagram depicting an exemplary embodiment of a method for subsequently identifying a web server in accordance with one or more aspects of the invention.

FIG. 4 is a flow diagram depicting an exemplary embodiment of a method 400 for subsequently identifying a web server in accordance with one or more aspects of the invention. The method 400 may be performed by the security agent 118. The method 400 may be understood with reference to FIG. 1, where the web server being identified is the web server 126. The method 400 begins at step 402, where the security agent 118 detects a subsequent request by the browser 124 to an intended web server (e.g., the web server 126 in the present case). The subsequent request indicates that the browser 124 is again attempting to access the web site provided by the web server 126. The subsequent request may be an HTTP request, as described above.

At step 404, the security agent 118 receives a response to the subsequent request from a responding web server. At present, the response is from a server purporting to be associated with the hostname of the intended web server (e.g., the web server 126). At step 406, the security agent 118 verifies that the responding server is the intended web server using fingerprints. In some embodiments, the security agent 118 verifies the responding server by fingerprinting the responding server. The security agent 118 then compares the fingerprint of the responding server with the fingerprint of the intended web server. The fingerprint of the intended web server may be obtained from the fingerprint database 122 using the hostname/IP address referred to in the subsequent request. If the fingerprints match, the responding server is verified as the intended web server. Otherwise, the responding server is deemed to be illegitimate. The security agent 118 may fingerprint the responding server using a process similar to the method 300 of FIG. 3.

Figure 5:
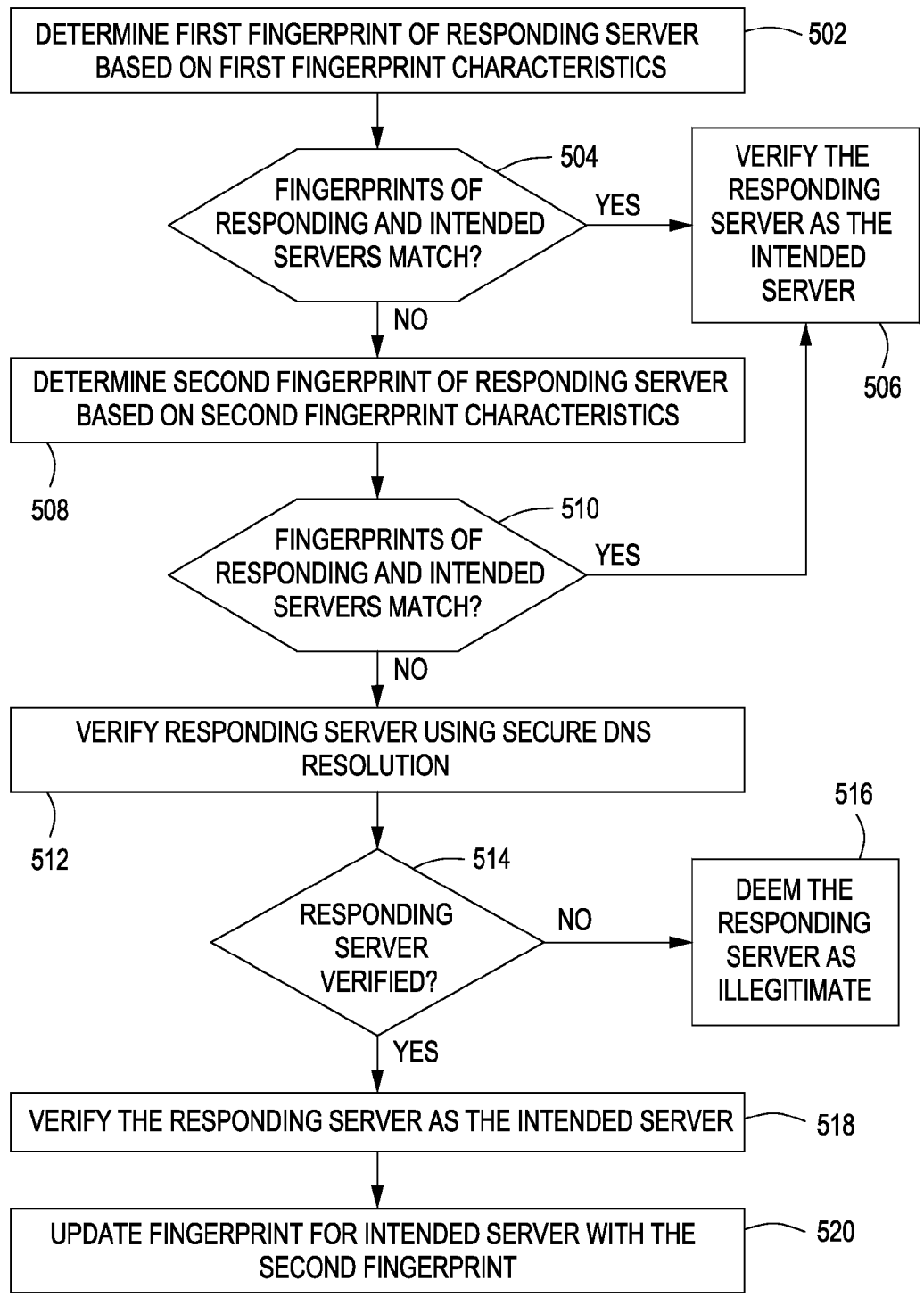
FIG. 5 is a flow diagram depicting another exemplary embodiment of a method for verifying a responding web server against a fingerprint in accordance with one or more aspects of the invention.

FIG. 5 is a flow diagram depicting another exemplary embodiment of a method 500 for verifying a responding web server against a fingerprint in accordance with one or more aspects of the invention. The method 500 may be performed by the security agent 118 and may be performed during step 406 of the method 400. The method 500 may be understood with reference to FIG. 1, where the web server 126 is the intended web server of the subsequent request. At step 502, the security agent 118 determines a first fingerprint of the responding server based on first fingerprint characteristics. The first fingerprint may be determined using a process similar to the method 300 of FIG. 3. The first fingerprint characteristics may be selected such that a minimal fingerprint is determined (i.e., a minimal number of requests are sent to the responding server by the security agent 118 to determine the fingerprint).

At step 504, a determination is made whether the first fingerprint matches the fingerprint of the intended web server. By match, it is meant that the characteristics of the first fingerprint match or substantially match corresponding characteristics of the fingerprint of the intended web server. The degree of matching between the individual characteristics that yields a fingerprint match may be a design parameter.

If the first fingerprint matches the fingerprint of the intended web server, the method 500 proceeds to step 506, where the security agent 118 verifies the responding server as the intended web server. Otherwise, the method 500 proceeds to step 508. At step 508, the security agent 118 determines a second fingerprint of the responding server based on second fingerprint characteristics. The second fingerprint may be determined using a process similar to the method 300 of FIG. 3. The second fingerprint characteristics may be selected to include more characteristics than the first fingerprint characteristics. The second fingerprint characteristics may include the first fingerprint characteristics plus additional characteristics. Thus, the second fingerprint is stricter than the first fingerprint.

At step 510, a determination is made whether the second fingerprint matches the fingerprint of the intended web server. By match, it is meant that the characteristics of the second fingerprint match or substantially match corresponding characteristics of the fingerprint of the intended web server. The degree of matching between the individual characteristics that yields a fingerprint match may be a design parameter. If the second fingerprint matches the fingerprint of the intended web server, the method 500 proceeds to step 506. Otherwise, the method 500 proceeds to step 512.

At step 512, the responding server is verified using a secure DNS resolution. For example, the security agent 118 may perform a reverse DNS lookup using the IP address of the packets carrying responses of the responding server to obtain a hostname. Those skilled in the art will appreciate that other mechanisms of secure DNS resolution may be employed to verify that the web server responding to the initial request is indeed the desired web server. At step 514, a determination is made whether the hostname obtained from secure DNS resolution matches that of the intended web server as indicated in the subsequent request. If so, the method 500 proceeds to step 518; otherwise the method 500 proceeds to step 516. At step 516, the responding server is deemed to be illegitimate and not identified as the intended web server. Thus, in cases of pharming, phishing, DNS attacks, or the like where the subsequent request was being redirected to an illegitimate server, the attack would be unsuccessful.

At step 518, the security agent 118 verifies the responding server as the intended web server. At step 520, the fingerprint of the intended web server is updated according to the second fingerprint. For example, the fingerprint for the web server 126 stored in the fingerprint database 122 is replaced with the second fingerprint. Thus, in cases where the first and second fingerprints failed due to changes in the infrastructure of the web server environment 108, the fingerprint for the web server 126 is automatically updated.

Embodiments of the invention include various modifications of the method 500. In general, one or more fingerprints of the responding server may be determined. Each determined fingerprint may involve more fingerprint characteristics than the previously determined fingerprint.

Returning to FIG. 4, at step 408, a determination is made whether the responding server has been verified as the intended web server. If not, the method 400 proceeds to step 410; otherwise the method 400 proceeds to step 412. At step 410, the security agent 118 blocks the response to the subsequent request from being handled by the browser 124. The security agent 118 may inform the user via the browser 124 of the action taken, as well as providing various other types of information related to identification/verification process. At step 412, the security agent 118 allows the browser 124 to handle the response and traffic from the responding web server.

Note that the initial and subsequent requests referred to in the methods 200 and 400 may be initiated by a user through the browser 124, or may be automatically initiated by the browser 124. For example, having navigated to a particular web site, the web site may include advertisements or the like that trigger further requests to web servers without any interaction by the user. The security agent 118 may process such requests in the same manner as requests initiated by the user.

It should be understood that the fingerprint mechanism described above is an attempt at identifying a web server. The presence of various devices and systems in the web server environment 108 may obfuscate any attempt to directly identify a given web server, such as load balancers, firewalls, and the like. Moreover, web server software may be configured to conceal the identity of the web server in an attempt to avoid being identified using mechanisms such as the fingerprint mechanism described herein. However, it is not necessary in the identification methods described above to identify a web server exactly, including its software version, patch level, etc. As discussed above, the fingerprint relates to the web server environment, rather than the web server in particular. Hence, if there is a load balancer deployed in front of the web server, the fingerprint may be a combination of characteristics of the web server and the load balancer. Such a fingerprint may be adequately used to distinguish an intended web server from an illegitimate web server. Accordingly, although the description above refers to a fingerprint of a web server, it is to be understood that in some cases the fingerprint is actually of the web server environment.

Furthermore, it is to be understood that there may be multiple fingerprints for a particular web server environment. Thus, the fingerprint database may store multiple fingerprints associated with a given web server. In any case where fingerprints are checked between a responding server and an intended server, it is to be understood that the fingerprint of the responding server may be compared against multiple fingerprints of the intended server if such multiple fingerprints exist. For example, multiple fingerprints may be established for traveling computers that access a given web server from geographically separate regions. The web server environment may produce different fingerprints when accessed from such different geographically separate regions.

The above-described web server identification mechanism is user-specific. That is, a database of fingerprints on one computer will likely be different than a database of fingerprints on another computer. This is true simply because different users navigate to different web sites and interact with different web servers. Thus, the security agent described above may be tuned to the behavior of a specific user or group of users. This is in contrast with other security technologies, where all users are protected collectively (e.g., white list/black list technologies), which results in a large database of illegitimate web servers and exhibits slower performance.

Figure 6:
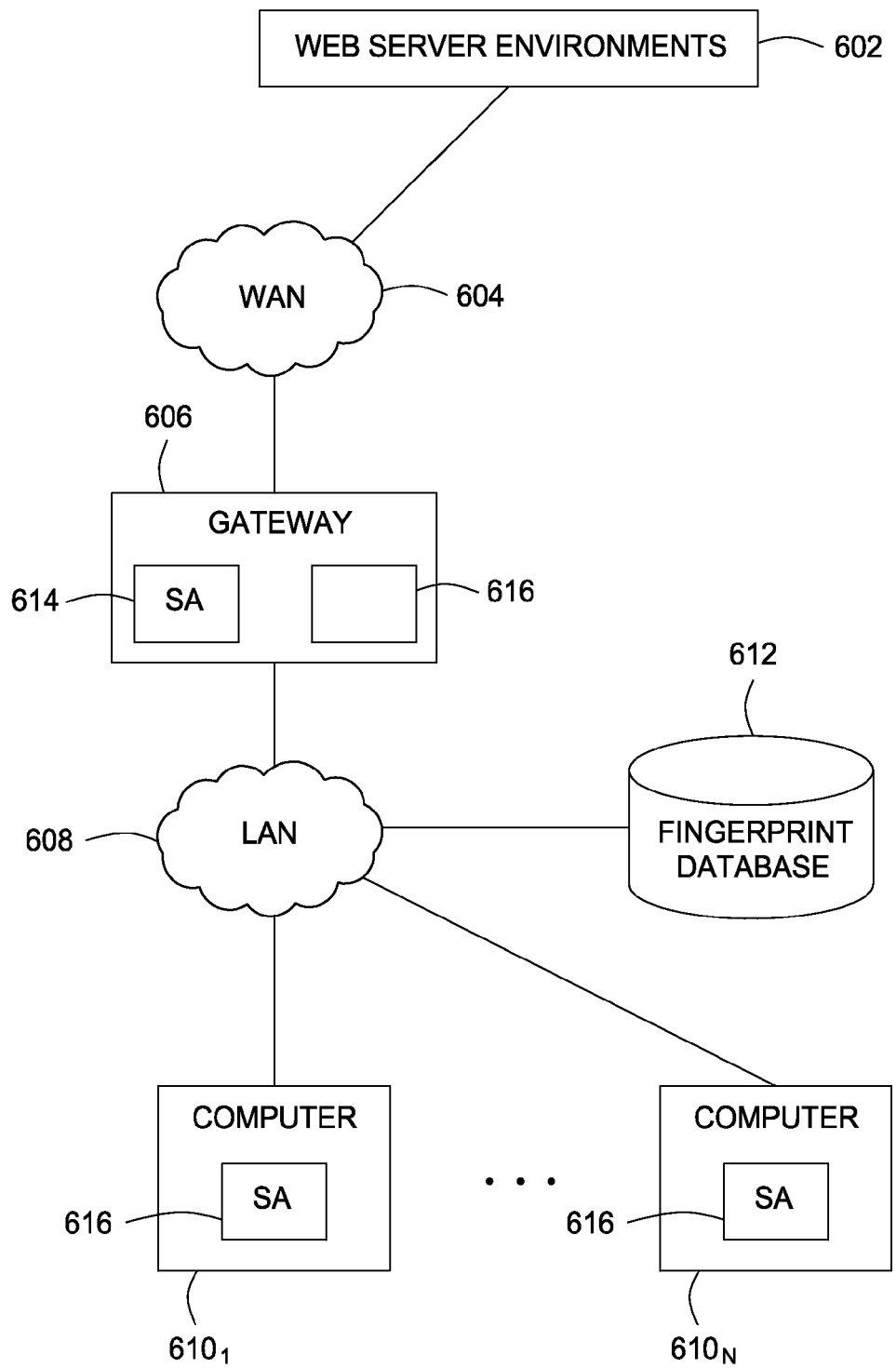
FIG. 6 is a block diagram depicting another exemplary embodiment of a communication system in accordance with one or more aspects of the invention.

FIG. 6 is a block diagram depicting another exemplary embodiment of a communication system 600 in accordance with one or more aspects of the invention. The present embodiment adapts the fingerprinting mechanism of the invention described above to an enterprise network configuration or other type of small office or home network configuration. In the present embodiment, the system 600 includes a web server environment 602, a wide area network (WAN) 604, a gateway 606, a local area network (LAN) 608, and computers 610-1 through 610-N (collectively computers 610, where N is an integer greater than zero). The WAN 604 comprises a communication system that connects computer systems by wire, cable, fiber optic, and/or wireless links facilitated by various types of well-known network elements, such as hubs, switches, routers, and the like. For example, the WAN 604 may be part of the Internet and thus employ internet protocol (IP), transmission control protocol (TCP), and the like for the transmission of packets. The LAN 608 comprises a communication system that connects computer systems by wire, cable, fiber optic, and/or wireless links facilitated by various types of well-known network elements, such as hubs, switches, routers, and the like. The LAN 608 is coupled to the WAN 604 via a gateway 606.

Each of the web server environments 602 may include one or more servers, appliances, and/or devices configured to communicate WWW content with hosts connected to the WAN 604, including the computers 610 as connected to the WAN 604 through the LAN 608 and the gateway 606. In some embodiments, the gateway 606 includes a security agent (SA) 614. The security agent 614 operates similarly to the security agent 118 described above, but services each of the computers 610. That is, the security agent 614 employs the web server fingerprint mechanism for requests from each of the computers 610. The gateway 606 may also include a fingerprint database 616 for providing a common source of fingerprints for the computers 610.

In other embodiments, a separate fingerprint database 612 is coupled to the LAN 608. The fingerprint database 612 provides a common source of web server fingerprints for the computers 610. The SA 614 in the gateway 606 is configured to store and retrieve the fingerprints from the fingerprint database 612. In other embodiments, each of the computers 610 is configured with an SA 616 similar to the security agent 118 described above. The computers 610 may store and retrieve their own fingerprint database locally, or may store and retrieve fingerprint data from the central fingerprint database 612.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of identifying a web server on a network, comprising:
   identifying an initial request by a client to an intended web server;
   transmitting, to the intended web server, a fingerprint request in response to identifying the initial request, wherein the fingerprint request elicits a fingerprint response that indicates one or more fingerprint characteristics;
   determining a fingerprint for the intended web server using the one or more fingerprint characteristics, wherein the fingerprint is determined based on at least one of one or more lexical characteristics, one or more syntactic characteristics, and one or more semantic characteristics associated with the fingerprint response;
   detecting a subsequent request by the client to the intended web server;
   receiving a response to the subsequent request from a responding web server; and
   verifying that the responding web server is the intended web server using the fingerprint, wherein verifying comprises:
      analyzing the one or more fingerprint characteristics of the response to determine at least one fingerprint of the responding web server,
      determining a first fingerprint of the responding web server based on a first portion of the one or more fingerprint characteristics, and
      determining a second fingerprint of the responding web server based on a second portion of the one or more fingerprint characteristics in the event the first fingerprint of the responding web server does not match the fingerprint of the intended web server.

2. The method of claim 1, further comprising:
   allowing the client to handle the response if the responding web server is verified as the intended web server based on the fingerprint; and
   blocking the response if the responding web server is not verified as the intended web server based on the fingerprint.

3. The method of claim 1, wherein the step of verifying further comprises:
   eliciting at least one response from the responding web server having the fingerprint characteristics; and
   comparing the at least one fingerprint with the fingerprint of the intended web server.

4. The method of claim 3, wherein the step of analyzing further comprises:
   if either the first fingerprint or the second fingerprint match the fingerprint of the intended web server, indicating that the responding web server is verified as the intended web server.

5. The method of claim 4, further comprising:
   if the second fingerprint of the responding web server does not match the fingerprint of the intended web server, determining a hostname associated with an internet protocol (IP) address obtained from packets having the subsequent request using secure domain name system (DNS) resolution;
   indicating that the responding web server is verified as the intended web server if the determined hostname matches a hostname of the intended web server as set forth in the subsequent request; and
   blocking traffic from the responding web server to the client if the determined hostname does not match the hostname of the intended web server.

6. The method of claim 5, further comprising:
   if the determined hostname matches the hostname of the intended web server and the second fingerprint does not match the fingerprint of the intended web server, re-determining the fingerprint of the intended web server based on the second fingerprint.

7. The method of claim 1, wherein the step of determining comprises:
   eliciting at least one response from the intended web server; and
   analyzing the fingerprint characteristics of the at least one response to determine the fingerprint of the intended web server.

8. The method of claim 7, wherein the step of determining further comprises:
   determining hostname associated with an internet protocol (IP) address obtained from packets having the initial request using secure domain name system (DNS) resolution;
   storing the fingerprint in a database if the determined hostname matches a hostname of the intended web server as set forth in the initial request.

9. Apparatus for identifying a web server on a network, comprising:
   means for identifying an initial request by a client to an intended web server;
   means for transmitting, to the intended web server, a fingerprint request in response to identifying the initial request, wherein the fingerprint request elicits a fingerprint response that indicates one or more fingerprint characteristics;
   means for determining a fingerprint for the intended web server using the one or more fingerprint characteristics, wherein the fingerprint is determined based on at least one of one or more lexical characteristics, one or more syntactic characteristics, and one or more semantic characteristics associated with the fingerprint response;
   means for detecting a subsequent request by the client to the intended web server;
   means for receiving a response to the subsequent request from a responding web server; and
   means for verifying that the responding web server is the intended web server using the fingerprint, wherein the means for verifying comprises:

means for analyzing the one or more fingerprint characteristics of the response to determine at least one fingerprint of the responding server, means for determining a first fingerprint of the responding web server based on a first portion of the one or more fingerprint characteristics, and means for determining a second fingerprint of the responding web server based on a second portion of the one or more fingerprint characteristics in the event the first fingerprint of the responding web server does not match the fingerprint of the intended web server.

10. The apparatus of claim 9, further comprising:

means for allowing the client to handle the response if the responding web server is verified as the intended web server based on the fingerprint; and means for blocking the response if the responding web server is not verified as the intended web server based on the fingerprint.

11. The apparatus of claim 9, wherein the step of verifying comprises:

means for eliciting at least one response from the responding web server having the fingerprint characteristics; and means for comparing the at least one fingerprint with the fingerprint of the intended web server.

12. The apparatus of claim 11, wherein the means for analyzing comprises:

means for indicating that the responding web server is verified as the intended web server if either the first fingerprint or the second fingerprint match the fingerprint of the intended web server.

13. The apparatus of claim 12, further comprising:

means for determining a hostname associated with an internet protocol (IP) address obtained from packets having the subsequent request using secure domain name system (DNS) resolution if the second fingerprint of the responding web server does not match the fingerprint of the intended web server;

means for indicating that the responding web server is verified as the intended web server if the determined hostname matches a hostname of the intended web server as set forth in the subsequent request; and means for blocking traffic from the responding web server to the client if the determined hostname does not match the hostname of the intended web server.

14. The apparatus of claim 13, further comprising:

means for re-determining the fingerprint of the intended web server based on the second fingerprint if the determined hostname matches the hostname of the intended web server and the second fingerprint does not match the fingerprint of the intended web server.

15. The apparatus of claim 9, wherein the means for determining comprises:

means for eliciting at least one response from the intended web server; and means for analyzing the fingerprint characteristics of the at least one response to determine the fingerprint of the intended web server.

16. The apparatus of claim 15, wherein the means for determining further comprises:

means for determining hostname associated with an internet protocol (IP) address obtained from packets having the initial request using secure domain name system (DNS) resolution;

means for storing the fingerprint in a database if the determined hostname matches a hostname of the intended web server as set forth in the initial request.

\* \* \* \* \*